United States Patent
Carlin et al.

(10) Patent No.: US 8,986,433 B2
(45) Date of Patent: Mar. 24, 2015

(54) COOLING PROCESS OF HEAT REACTIVATED DESICCANT AIR DRYER SYSTEMS USING BLOWER PURGE AND METHOD THEREFORE

(71) Applicant: John A. Carlin, Buffalo, NY (US)

(72) Inventors: John A. Carlin, Buffalo, NY (US); Raymond Arno

(*) Notice: Subject to any disclaimer, the term of this patent is extended or adjusted under 35 U.S.C. 154(b) by 193 days.

(21) Appl. No.: 13/764,164

(22) Filed: Feb. 11, 2013

(65) Prior Publication Data

US 2014/0224125 A1  Aug. 14, 2014

(51) Int. Cl.
*B01D 53/02* (2006.01)
*B01D 53/26* (2006.01)
*B01D 53/04* (2006.01)

(52) U.S. Cl.
CPC ......... *B01D 53/261* (2013.01); *B01D 53/0462* (2013.01); *B01D 2259/402* (2013.01)
USPC ................... 96/111; 96/112; 95/117; 95/121; 95/122; 95/123; 95/124; 95/125; 95/126

(58) Field of Classification Search
USPC ............................... 95/117–126; 96/111–112
See application file for complete search history.

(56) References Cited

U.S. PATENT DOCUMENTS

| | | | |
|---|---|---|---|
| 4,783,432 A * | 11/1988 | Settlemyer | 502/34 |
| 5,632,802 A | 5/1997 | Grgich et al. | |
| 5,647,891 A * | 7/1997 | Blizzard et al. | 95/99 |
| 5,755,854 A * | 5/1998 | Nanaji | 95/11 |
| 6,099,620 A | 8/2000 | Arno et al. | |
| 6,447,583 B1 | 9/2002 | Thelen et al. | |
| 2014/0223767 A1* | 8/2014 | Arno | 34/549 |

* cited by examiner

*Primary Examiner* — Christopher P Jones
(74) *Attorney, Agent, or Firm* — Kloss, Stanger & LoTempio; Vincent G. LoTempio; David Stephenson

(57) ABSTRACT

The present invention provides a method and process for effectively purging desiccant air dryer systems from moisture load, by a 'deep cooling' regeneration means with the use of a primary high heating and a secondary low heating blower purge air flows, a heater discharge temperature set point, and a bottom area bed temperature of a vessel containing desiccant. The system of an improved heat regenerating desiccant compressed air dryer having means to terminate heating operations as well as cooling and dry purge operations allowing for the newly regenerated tower vessel to come back on-line for a compressed air drying cycle without negative effects of dew point bumps and outlet heat spike. Such dryer system delivers a high confidence of dried compressed air while saving energy, unnecessary cycling of heater and contactors and time.

20 Claims, 5 Drawing Sheets

COOLING PROCESS OF HEAT REACTIVATED DESICCANT AIR DRYER SYSTEMS USING BLOWER PURGE AND METHOD THEREFORE

CROSS REFERENCE TO RELATED APPLICATIONS

This application claims the benefit of U.S. Provisional Application of Raymond P. Arno and John A. Carlin, Ser. No. 61/596,941, filed 9 Feb. 2012, having the title IMPROVED COOLING PROCESS OF HEAT REACTIVATED DESICCANT AIR DRYER SYSTEMS USING BLOWER PURGE AND METHOD THEREFORE, which is incorporated herein by reference in its entirety.

FIELD OF THE DISCLOSURE

The present disclosure relates generally to the field of desiccant air dryer systems, and more particular to the cooling phase of a regeneration process in blower purging the system of absorbed moisture captured during its operating cycle.

BACKGROUND

In the field of industrial machinery, there exists a need for 'dry' air in the process of operating air driven devices, product process and fabrication, etc. in countless applications and scenarios. Air and pressurized 'compressed' air in particular, is laden with moisture that negatively impacts its effectiveness in the above mentioned uses and processes; making costly equipment failure and 'befouled' product. 'Desiccant dryers' are one of the prime methods that remove substantially the moisture from air for such industrial uses, thus reducing equipment failures and improving product quality.

U.S. Pat. No. 6,099,620 ('620) issued to Arno et al., teaches the use of parallel inlet ports to directly communicate with side walls of the desiccant vessel and with the interior of the desiccant bed. The system was effective in delivering purge air to the stratified regions of the desiccant bed most laden with moisture. U.S. Pat. No. 6,447,583 issued to Thelen et al., taught the use of a rotating drum and a high speed blower for boosting pressure of the regeneration exhaust stream and a gas control valve to change flow rates. The Thelen patent teaches a highly mechanical system with a series of complicated belts, motors and rotating mechanisms. U.S. Pat. No. 5,632,802 issued to Grgich et al., teaches an air filter affixed to a blower used to communicate with a heater, valves and desiccant bed.

None of the above approaches discloses a means for thermally balancing the vessel containing desiccant during a purge phase of regeneration; assuring that both dew point bumps and heat spikes do not develop. Further none of the above approaches sets forth a method to complete a regeneration in less time in the process. Finally, none of the prior art addresses the energy savings related to an efficient means of operating a quality air drying apparatus.

Thus, a heretofore unaddressed need exists in the industry to address the aforementioned deficiencies and inadequacies.

SUMMARY

In accordance with the present disclosure an improved cooling process of heat reactivated desiccant air dryer systems using blower purge and method therefore are provided which effectively processes the purge regeneration in both heating and cooling, limiting heating durations and cooling minimum temperatures; assuring blower air flows do not re-load or reintroduce moisture to dried desiccant effectively stabilizing the system while eliminating the potential creation of negative dew point bumps (by inherent blower loading) and heat spikes (by hidden hot spots within the desiccant). The disadvantages are overcome and the desiccant bed is renewed without overheating, without excessive equipment cycling and wear-&-tear, and, without negative effects.

The purpose of this disclosure is to provide an improved heat regenerated desiccant gas dryer and method of regeneration air dryer comprising: a means to produce a primary high heating period and a secondary low heating period of blower purge air flows to a bed of desiccant within at least one tower vessel within the air dryer; a means to measure and control heater discharge temperatures and dew point of said at least one tower vessel; a means to dry purge at least one tower vessel within said air dryer for deep cooling, a means for measuring the desiccant bed bottom area temperature and terminating the dry purging based upon deep cooling of the desiccant bed; wherein, the primary high heating period of blower purging is followed by the secondary low heating period of blower purging to complete the heating phase in regenerating the desiccant, and, a means to terminate said low secondary heating period of blower purging and begin the dry purge means of at least one tower vessel within said air dryer for deep cooling, enabling the system to be cooled and repressurized and returned to a dryer mode cycle of operation.

It is therefore a primary object of the present disclosure is to provide an improved process for a blower purge regeneration system having a primary heating and a secondary heating means to limit heat during the heating phase. Having capability to stop heating before required time and still achieve the purging of the moisture laden desiccant bed to affect a thermal balance of heat and reduce or eliminate undesirable side effects.

Another object of the present disclosure is to provide an improved cooling process of heat reactivated desiccant air dryer system that stabilize temperature during the cooling phase, making the desiccant bed not possible to re-load moisture as a result of the ambient air introduced by the blower, as the blower air dose the cooling thus eliminating undesirable dew point bumps and further reduce undesirable heat spikes.

Another object present disclosure is to provide an improved cooling process of heat reactivated desiccant air dryer system that affect the purge phase in a balanced thermal environment which reduces excessive overheating of localized vessel areas, desiccant and related piping; further reducing the possibility of developing dew point bumps. To control heat energy by making the purge air flow process a less wasteful and potentially less damaging to the desiccant material.

Still another object of the present disclosure is to provide an improved cooling process of heat reactivated desiccant air dryer system which reduces energy consumption as it relates to regeneration and purging the loaded moisture in the bed of desiccant and to allow the apparatus to be back in service to a drying mode of operation in less time. To make available the dryer apparatus for service in a 'dryer' mode in its intended use in less time.

Yet another objective of the present disclosure is to provide an improved cooling process of heat reactivated desiccant air dryer system to reduce or eliminate the effects of blower re-loading the desiccant, as the result of using the blower to cool the desiccant bed.

Finally, a further objective of the present disclosure is to provide an improved cooling process of heat reactivated desiccant air dryer system to greatly reduce the operational cost of dryer system regeneration.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
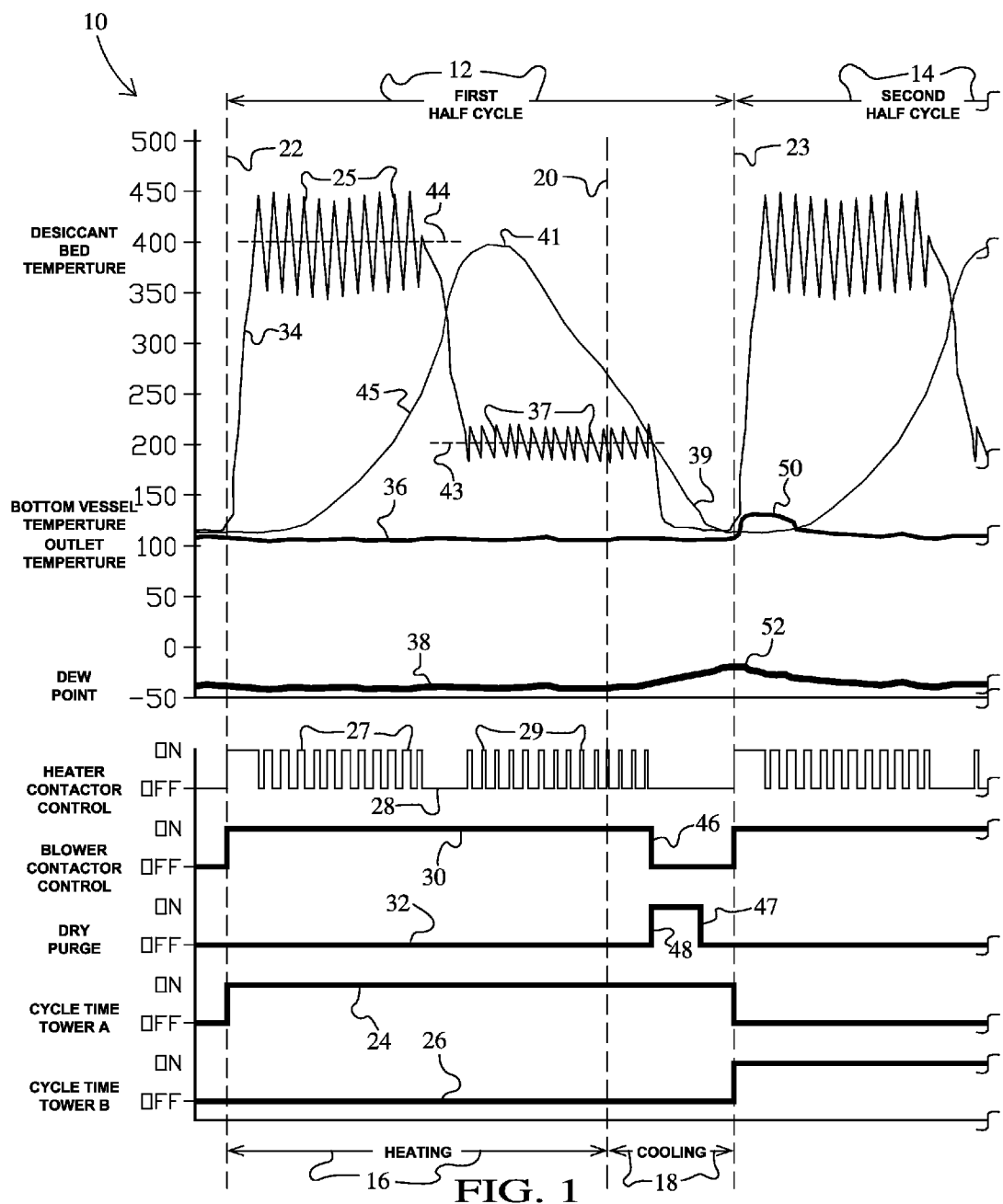
FIG. 1 is a graph illustration of the present invention showing all related waveforms represented in time of a purge/regeneration cycle and the immediate effects thereafter.

Reference is now made in detail to the description of the embodiments as illustrated in the drawings. While several embodiments are described in the connection with these drawings, there is no intent to limit the disclosure to the embodiment or embodiments disclosed herein. On the contrary, the intent is to cover all alternatives, modifications, and equivalents.

It should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Desiccant air drying systems typically are comprised of a pressure vessel filled with 'desiccant' material, a means of valves and piping to control air flow throughput and a purge means. These systems may have other useful features such as filters to remove oil and dirt, screens to contain the desiccant within the vessel, electric motor or air driven actuators and solenoids, electronic controls and 'liquid' condensate draining devices as well as other features. Many configurations of desiccant air dryers are constructed of 'dual' components so that the apparatus may be 'on-line' using one set of components while the second set is purging itself of captured moisture.

The purging process represents a significant amount of time and operating cost either in the functioning of heaters and/or blowers, or dry purge, to extract the collected moisture from the desiccant material during its drying phase. This regenerating process can take several hours to effect and represents typically fifty percent of the duty cycle of the dryer system, e.g., typically 4 hours 'on-line' drying compressed air and 4 hours 'off-line' regenerating, cooling and repressurizing (depending of the capacity/size of the system and air volume.) There are many other factors acting on a purge process. For example, 'dusting' of the desiccant due to excessive air velocity, moisture load velocity, radiant heat loss, contact time, fluidization, etc.; all in a balance between loading and purging the system, etc., which makes this process difficult to do well at best, and fraught with undesirable side effects.

Part of the problem stems from the excessive amount of heat necessary to dry the desiccant during the regeneration phase. Heated purging air is injected into the pressure vessel containing the moisture loaded desiccant material at one end and is forced over the desiccant as it goes through to the other end. The captivated moisture, attached to the desiccant, is more concentrated in the stratified layers at the 'air entry' end of the vessel and less moisture laden in the layers at the 'air exit' end of the vessel. The bottom end is the air entry end during the air drying phase of a cycle while the top end is the air entry end during the moisture purge regeneration phase of a cycle in an "up-flow drying" system configuration. Conversely, the top is the air entry end during the air drying phase of a cycle while the bottom end is the air entry end during the moisture purging regeneration phase of a cycle in a "down-flow drying" system. Either way, the temperatures involved, for example, may be 350 to >650 degrees Fahrenheit at the entry end while only being less than 200 degrees Fahrenheit at the air exit end of the vessel during the regenerizing process. It is important to understand that the stratified layers of temperature and moisture can substantially become imbalanced and can result having hotter layers 'hot spots' between colder layers along with more moisture laden layers between dryer layers.

This imbalance leads to higher temperatures in 'vessel heating' during the period of time it takes to fully purge substantially all the moisture from throughout the desiccant. One negative result of this phenomena is overly dried desiccant at one end and requires a longer period of time to 'cool down' the vessel before it is suitable for use again in the drying phase of the cycle. A second negative result is a dew point bump; where moisture laden air remains in the desiccant bed due to unintended loading from the blower purging process. Still another negative result is an outlet temperature spike due to the 'hot spots' in the stratified layer of desiccant within the bed, as air is pushed out of the system as 'dry air' that could cause problems in its use. This hot air discharge is particularly an issue with filters down-stream, even causing said filters to burn and disintegrate over time.

Further, the amount of time necessary to accomplish a proper regeneration (heating, cooling, dry purge and re-pressurizing) during regenerating cycle costs in terms of the apparatus being out of service.

Solution to the Problem

The efficacy of a regeneration cycle phase in the moisture purging of desiccant air dryer systems directly relates to an effective method of passing air through the vessel containing the moisture laden desiccant. The relationship between the heating phase and the cooling phase of regenerating can be successful (and not having undesirable side effects) only if thoughtful design and process is balanced. A process that removes any chance of unintended overheating, and, unintended blower reloading moisture of the desiccant. In such a scheme, the blower flow of purge air is maintained at a purge temperature high enough so moisture cannot adhere to the desiccant and thus be flushed out in the purging. The result being the moisture is carried off the desiccant and jettisoned out the vessel leaving a dry bed of desiccant and which will effectively eliminate the negative effects prevalent in prior art; heat spikes and dew point bumps when the newly regenerated tower of desiccant comes back on-line as the drying tower.

The present disclosure provides a process to effect a more efficient means to balance the thermal/air flow conditions in the regenerating process of a vessel containing desiccant material of an air dryer system. The result of this unique approach, reduces the amount of time to substantially purge all moisture from the desiccant bed thus saving energy. Further, the undesirable effect of overheating one end of the vessel is reduced or eliminated, making the regeneration phase of the cycle complete and so the unit is cooled faster and ready for service in less time, as compared to the conventional process of air dryer purge cycles. And finally, the system of the present disclosure makes it less likely that a dew point bump can develop due to consequential blower re-loading, and, eliminating substantially any heat spike at the dryer outlet when the newly regenerated tower comes on-line as the dryer tower.

Adverting now to the drawings, with reference to FIG. 1 is a waveforms graphic illustration 10 of both general 'state' and analog data, that would be produced from a twin tower compressed air dryer system of the present invention; illustrating a first half cycle 12 and a second half cycle 14. The second half cycle 12 is only partially shown to make the illustration more clear for presentation. The first half cycle 12 has a heating phase 16 and a cooling phase 18 (the second half cycle also has identical heating and cooling phases but are not referenced). Dashed line 20 indicates the time when the heating phase ends and the cooling phase begins. Further, a first and second half cycle start/end time lines are delineated by dashed lines 22 & 23 which indicate the starting point and ending point for each half cycle period.

States of operations are shown in a CYCLE TIME TOWER 'A' as waveform 24, and CYCLE TIME TOWER 'B' as waveform 26, a heater contactor control 28, a blower contactor control 30 and a dry purge control 32, as the mode/phases of operation waveforms. Waveforms 24, 26, 28, 30 and 32 are represented conventionally as active 'ON' being high and inactive 'OFF' as being low. Analog data are shown in a desiccant bed temperature waveform 34, an outlet temperature waveform 36, a dew point 38 waveform and a bottom vessel temperature waveform 45. Waveforms 34, 36, 38 and 45 are presented as various temperatures that would be produced as time progresses through the cycles. A primary 400 degree set point 44 temperature and a secondary 200 degree set point 43 temperature produce a high heating period 25 and a low heating periods 37 within the heater temperature at waveform 34. It would be obvious to anyone skilled in reading data graphs that all waveforms would result as mechanical sequences that function in the dryer system, as will be disclosed later.

In operation, the first half cycle 12 starts sequence as CYCLE TIME TOWER 'A', in waveform 24. The heater contactor control 28 and blower contactor control 30 become active at the first half cycle start/end time-line 22 cycle indications. The heater reaching a desired primary heat set point 44 (for example 400 degrees Fahrenheit). Blower air flow over the heater elements allows the heater to come to set point temperature. The heater contactor control turn ON and OFF as needed to maintain the primary 400 degree set point 44 temperature for the high heating period 25. The bottom vessel temperature 45 eventually measures a rise in bed temperature 41 temperature (as a result of the high heating period 25) and terminates the high heat sequence 27 of the heater contactor control 28 at a predetermined temperature (for example 250 degrees Fahrenheit). The heater contactor control 28 remain OFF until the heater cools to the secondary 200 degree set point 43 value, where the heater contactor control 28 resumes again to the lower heat sequence 29. The low heat sequence 29 results with the low heating period 37 of the desiccant bed and maintains the secondary 200 degree set point 43 for the waveform 34. After the bottom vessel temperature 45 measures a falling bed temperature to the equivalent of the secondary 200 degree set point 43 value, the heating operation can be completely terminated by both the heater contactor control 28 and the blower contactor control 30 being turn OFF 46. Dry purge ON 48 immediately takes over and the remaining moisture and any residual heat in the desiccant bed is further pushed out of the system. When bottom vessel temperature 45 cools to a deep cooling bed temperature 39 (for example 150 degrees), the dry purge can be terminated at dry purge OFF 47. Again, it will become more clear later when the mechanical aspects of the dryer system are discussed in FIG. 4.

The delineation dashed line 20, represents a maximum length of the heating phase 16, assuring at enough time for a proper cooling phase 18. Note that both the blower and the heater are active ON during the cooling phase. But because the desiccant bed was processed with the high heating period 25, that higher temperature captivated within the desiccant bed is pushed through the system using the lower heating period 37. No new 're-loading' of the desiccant bed, as the result of ambient air introduced via the blower, can be absorbed by the desiccant because the bed is maintained at the secondary 200 degree set point 43 during the low heating period 37. The desiccant cannot absorb moisture at such a temperature. The desiccant bed is substantially fully dried and flushed of moisture and all that remains is the pushing out any residual heat remaining from the low heating period 37. Because a 'dry' desiccant bed offers much less resistance (as compared to a loaded bed with stratified layer of moisture on the desiccant), the dry purge 32 can quickly flow through the system making the regeneration process complete.

The first half cycle 12 ends and the second half cycle starts at start/stop time-line 23. The outlet temperature a heat spike 50 is practically non-existent as is the absents of any appreciable dew point bump 52; which resulted as the system switched to the tower 'A' for dryer (and tower 'B' for regeneration). Where the example dew point of −40 degrees Fahrenheit had worsened near the end of first half cycle 12 as the drying tower 'B' was running out of drying capacity (as indicated on the waveform 38 to be in the area of −20 degrees Fahrenheit), this is normal. The newly regenerated tower 'A' coming on-line for drying, in the second half cycle, has restored the dew point back down to the desired −40 degree area with no, or barely discernible dew point bump. More will be discussed about FIG. 1 later, after prior art and the mechanical aspects of the present invention are disclosed.

Figure 2:
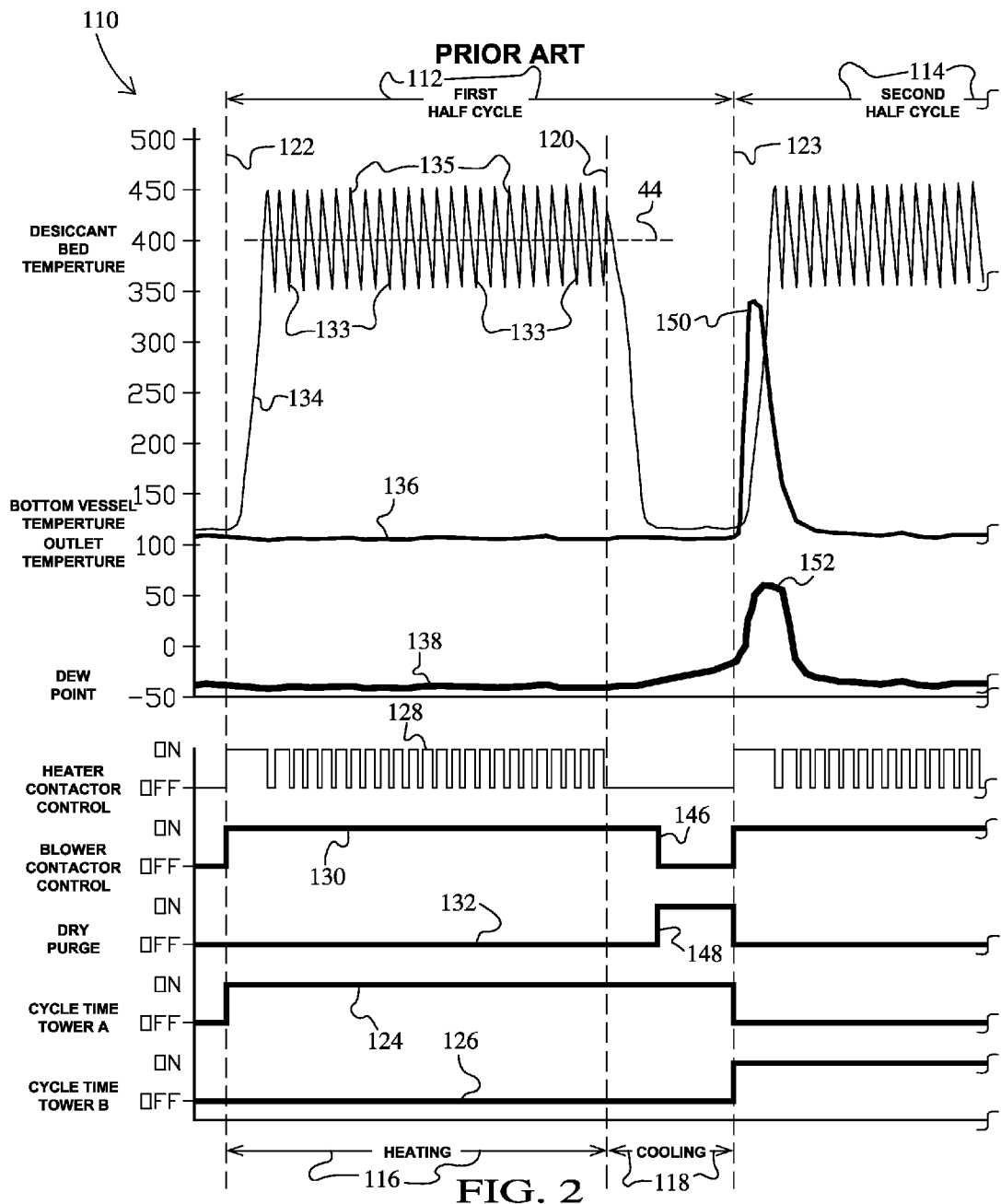
FIG. 2 is a graph illustration of the prior art showing all related waveforms represented in time of a purge/regeneration cycle and the immediate effects thereafter.

In FIG. 2, is shown a waveforms graphic illustration 110 of both general 'state' and analog data, that would be produced from a twin tower compressed air dryer system of a typical prior air configuration; illustrating a first half cycle 112 and a second half cycle 114. The second half cycle is only partially shown to make the illustration more clear in its presentation. The first half cycle 112 has a heating phase 116 and a cooling phase 118 (the second half cycle also has identical heating and cooling phases but are not referenced). A delineation dashed line 120 indicates the time when the heating phase ends and the cooling phase begins. Further, a half cycle start/end time-lines 122 & 123 dashed line indicate the starting point and ending point for each half cycle period.

States of operations are shown in a CYCLE TIME TOWER 'A' 124 waveform, a CYCLE TIME TOWER 'B' 126 waveform, a heater contactor control 128, a blower contactor control 130 and a dry purge control 132, as the mode/phases of operation waveforms. Waveforms 124, 126, 128, 130 and 132 are represented conventionally as active 'ON' being high and inactive 'OFF' as being low. Analog data are shown in a heater temperature 134 waveform, an outlet temperature 136 waveform and a dew point 138 waveform. Waveforms 134, 136 and 138 are presented as various temperatures that would be produced as time progresses through the cycles. It would be obvious to anyone skilled in reading data graphs that all waveforms would result as mechanical sequences the functions in the dryer system, as will be disclosed later.

In operation, the first half cycle 112 starts sequence as CYCLE TIME TOWER 'A', in waveform 124, and heater contactor control 128 becomes active at start/end time-line 122 cycle indications. Note that the heater contactor control 128 and the blower contactor control 130 has both activated at the start/end time line 122, and heater temperature waveform 134 as attempts to achieve a set point temperature (in the example, set point temperature is 400 degree Fahrenheit). Also the set point temperature is really never fully stable because it is constantly overshooting 135 and undershooting 133. This over and undershooting (hunting) can easily span 100 to 150 degrees Fahrenheit. This is due to the blower air flow over the heater elements, cooling it in effect. It will take substantial time for the heater to overcome such cooling, and when it does will overshoot the desired set point. When overshoot 135 occurs, the system has no choice but to turn the heater contactor 128 OFF, eventually resulting in a undershoot 133, and the undesirable hunting cycle continues.

Heating phase 116 continues until the end of the sequence at delineation dashed line 120, where upon the cooling phase begins. The blower continues to operate a portion of the cooling phase and finally turns off at blower OFF 146 indication. The remaining cooling phase 118 is achieved with dry purge ON 148 indication. The first half cycle 112 ends and the second half cycle starts at start/stop time-line 123. The outlet temperature has a heat spike 150 to 350 degree Fahrenheit which resulted as the system switched to the tower 'A' for dryer (and tower 'B' for regeneration). This heat spike phenomenon is due to any residual heat remaining in the desiccant bed after a regenerating process of tower 'A' and the direct result of the over & undershooting the heater temperature and heating for prolonged period of time. Further, it is important to note that there is a substantial dew point bump 152. The example, shows the dew point of −40 degrees Fahrenheit had worsened near the end of first half cycle 112 as the drying tower 'B' was running out of drying capacity (as indicated on the waveform 138 to be in the area of −20 degrees Fahrenheit), this is normal. The newly regenerated tower 'A' coming on line for drying, in the second half cycle, and the dew point rose up to the +50 degree area making a substantial, highly undesirable dew point bump for a considerable amount of time. More will be discussed about FIG. 2 later, after prior art and the mechanical aspects of the present invention are disclosed.

Figure 3:
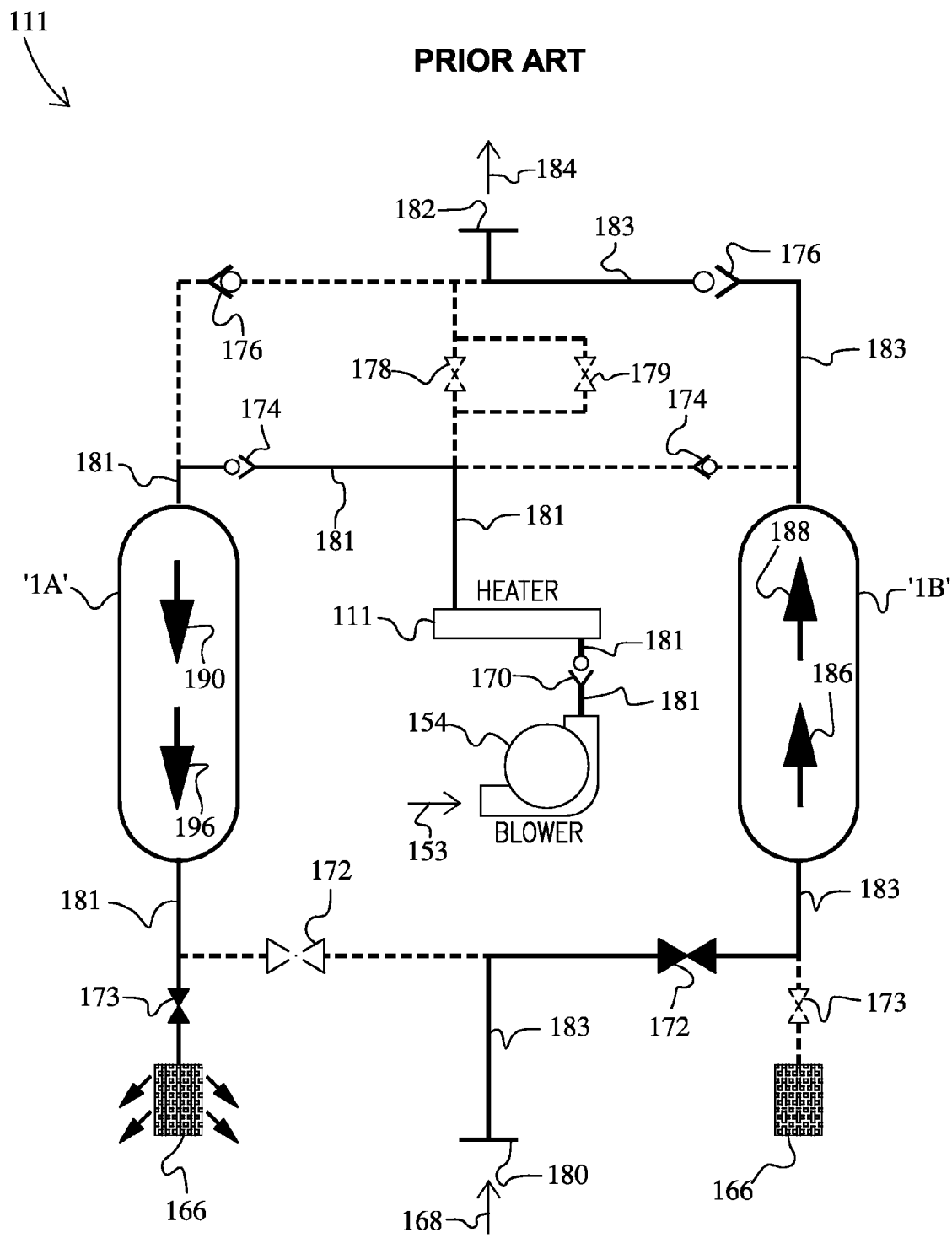
FIG. 3 is a component diagram of a prior art apparatus that could produce the waveforms illustrated in FIG. 2, showing the flows of both the purging/regenerating vessel and the drying dryer.

In FIG. 3 is a component diagram of a prior art apparatus that could produce the graphic illustration 110 waveforms demonstrated in FIG. 2, showing the flows of both the purging/regenerating and drying processes. Tower vessels '1A' & '1B' containing desiccant, blower 154, heater 158, exhaust mufflers 166, inlet valves 172, exhaust valves 173, purge check valves 174, outlet check valves 176, dry purge valve 178 and repressurization valve 179 generally comprise the prior air compressed air dryer system. The dryer has a moist compressed air dryer inlet port 180 and a dry compressed air dryer outlet port 182. Arrow 168 indicate to moist compressed air in flow, and arrow 184 indicate to dried compressed air out flow, of the dryer system 111.

Other typical components such as controllers, solenoids, actuators, electrical contactors, pressure regulators, orifices, filters and various electrical sensors are not shown for clarity of presentation and are not needed for understanding the essence of the system. Flow paths are shown in solid line while the none flow, due to a valve being closed, are shown in dashed line. For illustration, the tower '1A' is being regenerated (and corresponds to the first half cycle 112, heating phase 116, cooling phase 118, of CYCLE TIME TOWER '1A' 126, the heater contactor control 128 and blower contactor control 130 and the dry purge 132 of FIG. 2), and, the tower '1B' is drying the system throughput of compressed air (and also corresponds to the second half cycle 114 and CYCLE TIME TOWER '1B' 126 of FIG. 2). Regeneration pathways 181 solid line show the purging flows, while drying throughput pathways 183 solid lines show the compressed air paths being through the system. Arrows 186 and 188 show the drying tower '1B' desiccant bed flow with the arrow 186 being more heavily moisture loaded and the arrow 188 being less loaded in a moisture stratification of the bed. Arrows 190 and 196 show the regenerizing tower '1A' desiccant bed flow with the arrow 190 being more heated (and more dry) and the arrow 196 being less heated.

When the blower 154 operation is completed, referring back to FIG. 2, the bower contactor is made inactive at blower OFF 146 reference and the dry purge is made active at the dry purge ON 148 reference. The dry purge path is now using a small portion of the exiting compressed air through dry purge valve 178. Note that the blower check valve 170 would be closed (because the blower is off) and the purge path is directed to tower '1A'. Parallel to the dry purge valve 178 is a repressurization valve 179. The repressurization valve would assist in bringing which ever tower was newly regenerated back up to line operating pressure before the half cycle time line 122 & 123 of FIG. 2 is achieved. An illustration if the dry purge paths are more fully discussed later in the patent on FIG. 5. Anyone skilled in the art of compressed air dryer operation would understand that each tower becomes either the depressurized regenerating tower or the pressurized dryer tower by manipulation of the various inlet valves 172, exhaust valves 173 associated with each tower, and, dry purge valve 178 and repressurization valve 179.

In operation, the prior art compressed air dryer system 111 has started from a quiescent 'cool' state at half cycle time-line 122; where the illustrated temperatures (desiccant bed temperature 134, outlet temperature 136 and dew point 138) are all consistent with room temperature or cooled as would be found if the system was setting unused over night or a weekend in a factory scenario, and temperature would dissipate (cool) on their own. Note that waveforms 136 and 138 do not indicate a heat spike or dew point bump (as represented as 150 and 152 respectively in the second half cycle 114 after the time-line 123). It is important to understand the these heat spikes and dew point bumps are after each such reoccurring half cycle (as the prior art dryer system 111 is continuously used) on both the first and second half cycles; exactly as indicated with references 150 and 152 after time-line 123.

Figure 4:
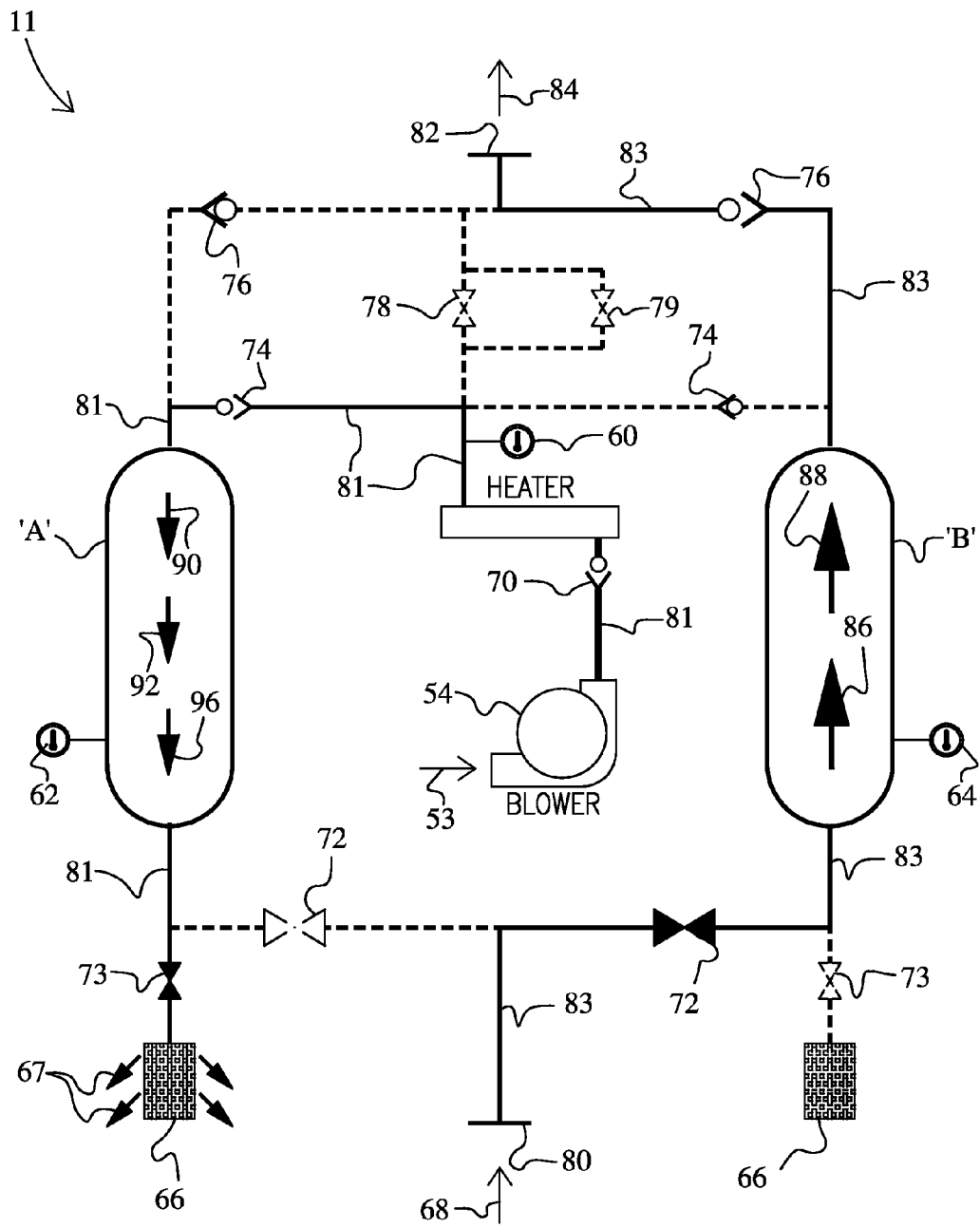
FIG. 4 is a component diagram of a present invention apparatus that could produce the waveforms illustrated in FIG. 1, showing the flows of both the purging/regenerating vessel and the drying dryer.

FIG. 4 is a component diagram of a present invention dryer system 11 that could produce the graphic illustration 10 of waveforms demonstrated in FIG. 1, showing flows of both the purging/regenerating and the drying process. A blower check valve 70, a heater discharge temperature sensor 60, a bottom desiccant bed temperature sensor 62 for tower/vessel 'A' and a bottom desiccant bed temperature sensor 64 for tower/vessel 'B' are disclosed. Further components of the dryer system 11 are tower vessels 'A' & 'B' containing desiccant, a blower 54, a heater 58, exhaust mufflers 66, inlet valves 72, exhaust valves 73, purge check valves 74 outlet check valves 76, a dry purge valve 78 and a repressurization valve 79 generally comprise the remaining the compressed air dryer system components of the present invention. The dryer has a moist compressed air dryer inlet port 80 and a dry compressed air dryer outlet port 82. Arrow 68 indicate moist compressed air in flow, and arrow 84 indicate dried compressed air out flow, of the dryer system 11 of the present patent.

Other typical components such as controllers, solenoids, actuators, electrical contactors, pressure regulators, orifices, filters and various other electrical sensors are not shown for clarity of presentation and are not needed to convey understanding of the invention. Flow paths are shown in solid line while the none flow, due to a valve being closed, are shown in dashed line. For illustration, the tower 'A' is being regenerated (and corresponds to the first of half cycle 12, heating phase 16, cooling phase 18, of CYCLE TIME TOWER 'A' 26, the heater contactor control 28 and blower contactor control 30 and the dry purge 32 waveforms of FIG. 1), and, the tower 'B' is drying the throughput of compressed air (and also corresponds to the second half cycle 14 and CYCLE TIME TOWER 'B' 26 waveform of FIG. 1). It is important to understand that the waveform 38 is the result of the 'dryness' of the desiccant bed of which ever tower is the active on-line drying tower.

Regeneration pathways 81 solid lines show purge air flows, while the drying throughput pathways 83 solid lines show the compressed air being dried through the system. Blower ambient air inlet is indicated by arrow 53. When the blower 54 is active ON, ambient air at arrow 53 is introduced into the system on the pathway 81 through check valve 70 and into heater 58. Heater discharge temperature sensor 60 would measure the temperature and follow a set point, for example 430 degree Fahrenheit (to maintain the primary 400 degree heat set point 44), and, 225 degree Fahrenheit (to maintain the secondary 200 degree heat set point). The higher temperature 430 degree and 225 degrees are necessary because of the all the metal (piping, vessels, etc.) components would absorb heat and the goal of 400 degree and 200 degree are the desired temperature needed for purging at the entry point of the desiccant bed. All downstream blower flow pathways 81 subsequent to the heater would be subject to the heater heating it up to a preset set points producing the high heating period 25 and low heating period 37, that would cycle the heater contactor 28 during high heat sequence 27 and low heat sequence 29. An example of a 1000 scfm compressed air dryer system would have a 70 cfm blower typically. To achieve the desired desiccant bed temperature 34 set point 44 of 400 degrees Fahrenheit, the heater discharge temperature of 430 degrees would be by heater contactor 28 cycling as needed.

Referring back to FIG. 4, arrows 86 and 88 show the drying tower 'B' desiccant bed flow with the arrow 86 being more heavily moisture loaded and the arrow 88 being indicative of less moisture loaded in a moisture stratification of the bed. Arrows 90, 92 and 96 show the regenerizing tower 'A' desiccant bed flow with the arrow 90 being most heated (and more dry) and the arrow 96 being least heated (and more moisture loaded). The arrows 92 represent greater degrees of dryness within the mid section of the bed, as temperature stratification due heat/purging process. To regenerate a desiccant bed, it is desirable to have 400 degrees Fahrenheit of purging air flowing into the vessel. To achieve a stable 400 degrees Fahrenheit purge set point 44, a heater discharge temperature of 430 degrees Fahrenheit would be set at temperature sensor 60 and the temperature of 430 degrees Fahrenheit at the heater discharge for high heating period 25 and low 225 degrees Fahrenheit at the heater discharge for low heating period 29.

It is important to understand that deep cooling 39 (as indicated on bottom vessel temperature 45 waveform in FIG. 1) can only happen with the process disclosed in the present invention. Further the deep cooling not only greatly reduces operating cost but produces superior operation without the negative dew point bumps and outlet heat spikes of prior art (as represented by 50 and 52 references). In the example 1000 scfm dryer system, the deep cooling process of present invention would operate on 7 to 8 kW of power, whereas the same 1000 scfm prior art dryer system would consume 15 to 19 kW of power. This saving is directly the result of early termination of the high heating period 25, entering the cooling phase sooner and with the low heating period to overcome re-loading of the desiccant by ambient blower air. This results in less dry purge 32 be necessary to complete the regeneration of the desiccant bed.

Figure 5:
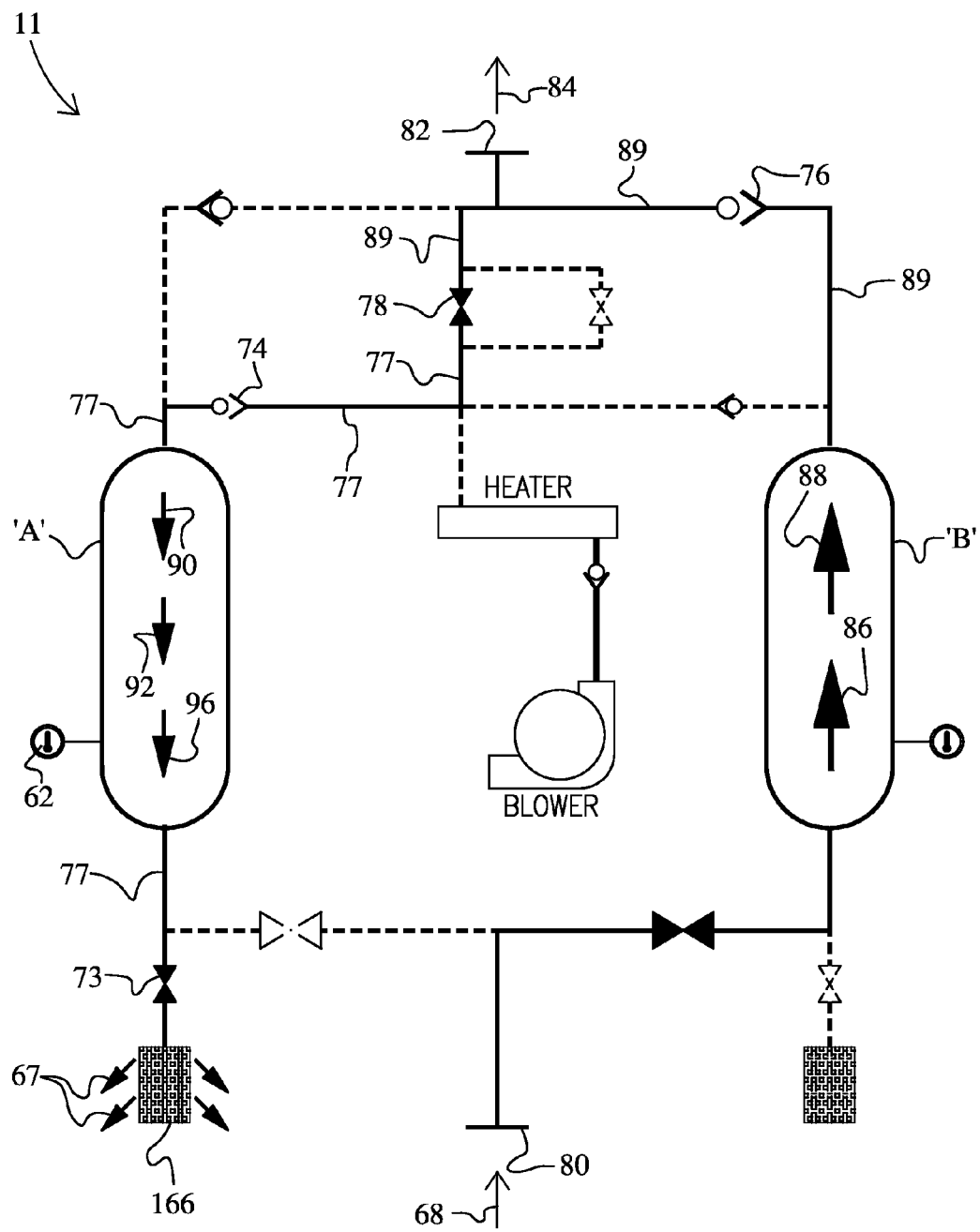
FIG. 5 sets forth the present invention in a component diagram illustrating purge regeneration configured in a dry purge phase.

When the blower 54 operation is completed, referring back to FIG. 1, the bower contactor is made inactive at blower OFF 46 reference and the dry purge is made active at the dry purge ON 48 reference (an illustration of the dry purge pathways is shown in FIG. 5). The dry purge pathway is now using a small portion or the exiting compressed air through dry purge valve 78. Note that the blower check valve 70 would be closed (because the blower is off) and the purge path is directed to tower 'A'. Parallel to the dry purge valve 78 is a repressurization valve 79. The repressurization valve would assist in bringing which ever tower was newly regenerated back up to on-line operating pressure before the half cycle time line 22 & 23 of FIG. 1 is achieved. Anyone skilled in the art of compressed air dryer operation would understand that each tower becomes either the depressurized regenerating tower vessel or the pressurized drying tower vessel by manipulation of the various inlet valves 72, exhaust valve 73 associated with each tower, and, dry purge valve 78 and repressurization valve 79.

In operation, the compressed air dryer system of the present invention 11 of FIG. 4, has started from a quiescent 'cool' state at half cycle time-line 22 (as indicated in waveforms of FIG. 1); where the illustrated temperatures (desiccant bed temperature 34, outlet temperature 36 and dew point 38) are all consistent with room temperature or cooled as would be found if the system was setting unused over night or a weekend in a factory scenario for example, and, the temperature could dissipate on their own. Note that dew point waveform 38 has no, or substantially none, dew point bump 52. This is achieved by heating of the desiccant bed where the 400 degree Fahrenheit purge air (430 degrees at the discharge of the heater), as indicated by arrow 90, is injected and penetrates effectively down the bed burning-off any captive moisture on the desiccant. As the heat progresses to the more stratified layers of moisture within the bed, as indicated by arrow 92 at 300 degrees, the low bed temperature sensor 62 registers the progress. When, for example 275 degree Fahrenheit is achieved on sensor 62, the heater 54 can now be switched to the second secondary 200 degree set point 43 for the low heating period 37. This early termination of the primary high heat set point 44 preset from 430 degrees, down to 225 degrees saves considerable energy and prevents over heating of the desiccant—which save the life of the desiccant. The 225 degree heat at the heater discharge would be cooled to about 200 degrees as it enters the vessel tower top of the bed. The 200 degrees is hot enough to prevent the desiccant from absorbing any of the moisture introduced by the blower ambient air. The 200 degrees purge air pushes-through the previously hotter 400 degrees air, stall within the bed, from the high heating period 25.

The heater continues to operate into the cooling phase 18 as long as the blower is operating. This guarantees that the blower will not re-load the top of the desiccant bed with more moisture, introduced by the ambient air from the blower flows. The 400 degree heat eventually makes its way down and is pushed out of the vessel. Once the bottom desiccant bed temperature sensor 62 measures the low heating period 37, the heater and blower operation can be completely terminated. The dry purge operation can now push any remaining heat through and out of the bed. This early termination of the heating process, save considerable energy and cycling wear and tear on the equipment. Further, this directly results in a 'clean' dew point, with no or very little dew point bump, and, with no heat spike, when the newly regenerated tower come on-line as the dryer tower, after a half cycle time-line 23 occurs.

In FIG. 5 illustrates the pathways of the dry purge in the cooling phase 18. Where the blower has become inactive and a dry purge valve 78 opens (reference FIG. 1 and note the blower OFF 46 and dry purge ON 48 indications). A small portion of the dried compressed air pathways 89, exiting the tower 'B' flow through the dry purge valve 78 as dry purge pathways 77 and into the tower 'A'. This −40 dew point dry air continues to push the heat and any residual moisture remaining in the lower sections of the desiccant bed, (as indicated by arrow 96) and out exhaust muffler 66. When the bottom desiccant bed temperature sensor 62 reads a reduced value of under 150 degrees Fahrenheit, the dry purging 32 process can end and the dry purge OFF 47, will further save energy and operation cost.

It is important to understand the half cycle time lines 22 & 23 in FIG. 1, are typically 'fixed' times, such as 4 hours (with a typical heating phase 16 being ¾ of the half cycle and the cooling phase 18 being ¼ of the half cycle). In prior art, as in FIG. 2, the delineation line 120 would be 'hard-wired', fixed to such a heating/cooling sequence. But the present patent allows the heating phase to terminate early (for example one hour or two hours into the phase depending on the moisture load within the desiccant bed) and advance directly to cooling. Further, due to the secondary 200 degree set point 43 and the low heating period 37 process of purging, cooling actually begins well within the heating phase 18; when the bottom desiccant bed sensor 62 reads a temperature (for example 250 degrees) consistent with hotter values of 430 degrees being ejected into the inlet end of the bed and the primary 400 degrees set point 44 can be ended early.

Although the delineation line 20 in FIG. 1 is shown at the ¾ time mark on the graphic illustration 10, it could effectively be anywhere along the time line of heating phase 16; directly relating to the amount of moisture loading on the desiccant bed. In such a scenario, if the delineation time line 20 where to be at only ¼ in the heating phase 16, the cooling phase would ensue immediately. And the cooling phase 18 could run the full ¼ allotted time, or terminate early by the referencing the bottom bed temperature sensor 62 as was disclosed in the previous paragraph. The system would just wait the remaining period of time in the half cycle 12 before switching towers at the half cycle interval, saving energy.

The present invention ideally uses the ¾ to ¼ ratio and a 4 hour half cycle interval, because this is a convenient and reasonable system design. The 4 hour half cycle is driven by the size of the tower containing the desiccant to maintain a drying phase dew point of typically −40 degrees under full load conditions. The system could be designed around a dew point, for example −100 degrees, and have all the benefits of the present patent, by adjusting the tower size and desiccant mass, heater and blower capacity, etc. It is also contemplated within the present patent, that a variable speed motor drive on the blower, and/or a electronic variable solid state controller (SCR) on the heater to better stabilize set point temperature could be used.

It should be obvious to anyone skilled in the art of desiccant air dryer systems that the art being taught in the present patent can achieve significant operating cost, equipment wear and tear, and superior performance. Further, although the above listed benefits are important, the process of the present invention removes the dew point bump, and the outlet heat spike at tower switch-over from a regenerating cycle to a drying on-line cycle, which makes the present invention practical for manufacturing and use in industry.

While the invention has been particularly described and illustrated in detail with reference to the preferred embodiment, it should be understood by those skilled in the art that equivalent changes in form and detail may be made without departing from the true spirit and scope of the invention as claimed, except as precluded by the prior art.

What is claimed is:

1. A system for regenerating desiccant in an air dryer comprising:
    a means to produce a primary high heating period and a secondary low heating period of blower purge air flows to a bed of desiccant within at least one tower vessel within said air dryer;
    a means to measure and control heater discharge temperatures and dew point of said at least one tower vessel;
    a means to dry purge at least one tower vessel within said air dryer for deep cooling,
    a means for measuring the desiccant bed bottom area temperature and terminating said dry purging based upon deep cooling of the desiccant bed;
    wherein, said primary high heating period of blower purging is followed by said secondary low heating period of blower purging to complete the heating phase in regenerating the desiccant, and, a means to terminate said low secondary heating period of blower purging and begin said dry purge means of at least one tower vessel within said air dryer for deep cooling, enabling the system to be cooled and repressurized and returned to a dryer mode cycle of operation.

2. The system for regenerating desiccant in an air dryer of claim 1, wherein said means for measuring the desiccant bed bottom area are temperature sensors disposed at the discharge of the heater to control primary and secondary purge temperature set points and to measure the temperature of the purging flows through the desiccant bed.

3. The system for regenerating desiccant in an air dryer of claim 2, wherein said measurement means includes a a control for a high heating period with high heat sequencing, and a low heating period and low heat sequencing.

4. The system for regenerating desiccant in an air dryer of claim 1, wherein said deep cooling desiccant bed flow temperatures are the result of early termination of primary heating period for high heat and secondary low heating period of heater purge flows to cool and to save operating energy during the regeneration.

5. The system for regenerating desiccant in an air dryer of claim 1, wherein said desiccant bed bottom area temperature is controlled based upon a measurement of purge flows of both heating phase and cooling phase, said measurement of purge flows measures the dryness of the desiccant bed.

6. The system for regenerating desiccant in an air dryer of claim 5, wherein said measurements allow for early termination of heating and the early termination of cooling phases of operation.

7. The system for regenerating desiccant in an air dryer of claim 1 wherein the flow of dry re-loading moist air to the bed is reduced by a dry purge valve.

8. A system for regenerating desiccant in an air dryer comprising:
a means to produce a primary high heating period of about degrees 430° F. and a secondary low heating period of about 225° F. of purge air flows to a bed of desiccant within at least one tower vessel of said air dryer; said purge air flow directed to at least one vessel containing desiccant to achieve a high heat of about 400° F. and a low heat of about 200° F. at the vessel entry area;
a means to measure heater discharge temperatures and bottom vessel temperatures; a means to measure desiccant bed bottom area temperature and read said high and low heating as it progresses through the desiccant bed, means to dry purge for deep cooling, and a means to measure dew point; wherein said bottom vessel is operatively arranged to achieve temperatures to maintain deep cooling of the desiccant bed and terminate dry purging;
wherein, said primary high heating is achieved at a set point of about 400° F. for a period of blower purging and is immediately terminated and followed by a secondary low heating set point of about 200° F. for a period of blower purging to complete the heating phase in regenerating the desiccant, and, a means to terminate said low secondary heating period of blower purging and begin said dry purge means of at least one tower vessel within said air dryer for deep cooling, enabling the system to be cooled and repressurized and returned to a dryer mode cycle of operation.

9. The system for regenerating desiccant in an air dryer of claim 8, wherein said measurement means are temperature sensors disposed at the discharge of the heater to control primary at a set point of about 400° F. and secondary set point of about 200° F. for purge temperature, wherein the measurement means are temperature sensors disposed at the bottom vessel area of the desiccant bed to read the status of purging flows through the desiccant bed.

10. The system for regenerating desiccant in an air dryer of claim 9 wherein the measurement means is operatively arranged to control a high heating period with high heat sequencing where heater is switched ON to maintain a high set point, a low heating period and low heat sequencing; where heater is switched ON to maintain a low set point.

11. The system for regenerating desiccant in an air dryer of claim 8, wherein said deep cooling desiccant bed flow temperature is controlled by early termination of primary high heating period for high heat of about 400° F. and secondary low heating period for low heat of about 200° F. of heater purge flows to cool and save operating energy during the regeneration.

12. The system for regenerating desiccant in an air dryer of claim 8, wherein said desiccant bed bottom area temperature is controlled based upon a measurement of purge flows of both heating phase and cooling phase; said measurement of purge flows measures the dryness of the desiccant bed and indicates a deep cooling process.

13. The system for regenerating desiccant in an air dryer of claim 12 wherein said measurements means control early termination of heating and the early termination of cooling phases of operation once deep cooling has been achieved.

14. The system for regenerating desiccant in an air dryer of claim 8 wherein the blower re-loading moist air to the bed means is eliminated by a dry purge valve in the deep cooling process.

15. A system process and apparatus for regenerating desiccant in an air dryer device comprising;
a means to produce a primary high heating period of about 400° F. to high purge temperatures and a secondary low heating period about 225° F. of purge air flows to a bed of desiccant within at least one tower vessel of said air dryer to start to cooling process; said purge air flow directed to a twin tower vessel configuration of a dryer system containing desiccant and achieve a high heat of about 400° F. and a low heat of about 200° F. at the vessel entry area during regeneration; means to measure heater discharge temperatures or the high and low temperature set points, and bottom vessel temperature sensing means; means to measure desiccant bed bottom area temperature and read said high and low heating as it progresses through the desiccant bed, means to dry purge for deep cooling elimination the opportunity for blower ambient air re-loading moisture in the desiccant bed being regenerated, and a means to measure dew point of the regenerated desiccant bed; said bottom vessel temperatures operatively configured to maintain the deep cooling process of the desiccant bed dryness and terminate dry purging early when dryness is accomplished;
wherein, said primary high heating set point of about 400° F. for a period of blower purging is configured to terminate high heat period and immediately start said secondary low heating set point at about 200° F. for a period of blower purging to complete the heating phase in regenerating the desiccant, and, said low heating period of blower purging configured to terminate low heat period and immediately start said dry purge period of the process enabling the system to be cooled and repressurized.

16. The system for regenerating desiccant in an air dryer of claim 15, wherein said measurement means are temperature sensors disposed at the discharge of the heater to control primary about 400° F. set point and secondary about 200° F. set point for purge temperatures, the measurement means are temperature sensors disposed at the bottom vessel area of the desiccant bed to read the status of purging flows through the desiccant bed as purging heat penetrates the stratified layers of moisture in captive in the desiccant bed.

17. The system for regenerating desiccant in an air dryer of claim 16 wherein the measurement means controls a high heating period with high heat sequencing where heater is switched ON to maintain a high set point to substantially burn-off captive moisture on the desiccant, a low heating period and low heat sequencing; where heater is switched ON to maintain a low set point and essentially start the cooling process, while maintaining a about 200° F. heat to prevent further re-loading of blower ambient air.

18. The system for regenerating desiccant in an air dryer of claim 15, wherein said deep cooling desiccant bed flow temperature occurs upon early termination of primary high heating period for high heat of about 400° F. and secondary low heating period for low heat of about 200° F. of heater purge flows to cool and save operating energy during the regeneration process.

19. The system for regenerating desiccant in an air dryer of claim 15, wherein said desiccant bed bottom area temperature means controls the temperature of the purge flows of both heating phase and cooling said measurement of purge flows in the dryness of the desiccant bed to determine the timing of the deep cooling process.

20. The system for regenerating desiccant in an air dryer of claim 19, wherein said measurements allow for early termination of heating and the early termination of cooling phases of operation once deep cooling has been achieved.

* * * * *